(12) United States Patent
Berding et al.

(10) Patent No.: US 6,801,389 B1
(45) Date of Patent: Oct. 5, 2004

(54) DISK DRIVE EMPLOYING A SPINDLE MOTOR COMPRISING A HUB RATCHET ARM DISENGAGED THROUGH ANGULAR VELOCITY

(75) Inventors: Keith R. Berding, San Jose, CA (US); John R. Gustafson, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 325 days.

(21) Appl. No.: 10/062,836

(22) Filed: Jan. 31, 2002

(51) Int. Cl.[7] ............................................. G11B 17/02
(52) U.S. Cl. .................... 360/99.08; 310/68 E
(58) Field of Search ............................ 310/254, 67 R, 310/90, 68 E; 188/184; 360/99.08, 99.04, 98.07, 97.01, 88; 29/596; 369/266, 269, 258, 264, 232, 258.1; 720/695, 698

(56) References Cited

U.S. PATENT DOCUMENTS

| | | | | |
|---|---|---|---|---|
| 1,834,624 A | * | 12/1931 | Kappler | 188/184 |
| 2,996,921 A | * | 8/1961 | Hirsch | 74/5.1 |
| 5,157,566 A | | 10/1992 | Hishikawa et al. | 360/99.08 |
| 5,251,081 A | | 10/1993 | Cossette et al. | 360/97.02 |
| 5,572,505 A | | 11/1996 | Llewellyn | 369/258.1 |
| 5,967,443 A | * | 10/1999 | Green | 242/381.5 |
| 5,988,328 A | * | 11/1999 | Newport | 188/186 |

FOREIGN PATENT DOCUMENTS

| | | | |
|---|---|---|---|
| JP | 57-190135 A | * | 11/1982 |
| JP | 2003-134731 A | * | 5/2003 |

OTHER PUBLICATIONS

Yomega, Product Info Website, Feb. 19, 2004.*

* cited by examiner

*Primary Examiner*—Julie Anne Watko
(74) *Attorney, Agent, or Firm*—Won Tae C. Kim, Esq.; Milad G. Shara, Esq.; Howard H. Sheerin, Esq.

(57) ABSTRACT

A disk drive is disclosed employing a spindle motor comprising a hub ratchet arm disengaged through angular velocity. In one embodiment the ratchet arm is connected to the hub and engages a spindle shaft or a stator, and in an alternative embodiment the ratchet arm is connected to the spindle shaft or the stator and engages the hub. In one embodiment the ratchet arm disengages through centrifugal force, and in an alternative embodiment the ratchet arm disengages through an air bearing or windage.

24 Claims, 12 Drawing Sheets

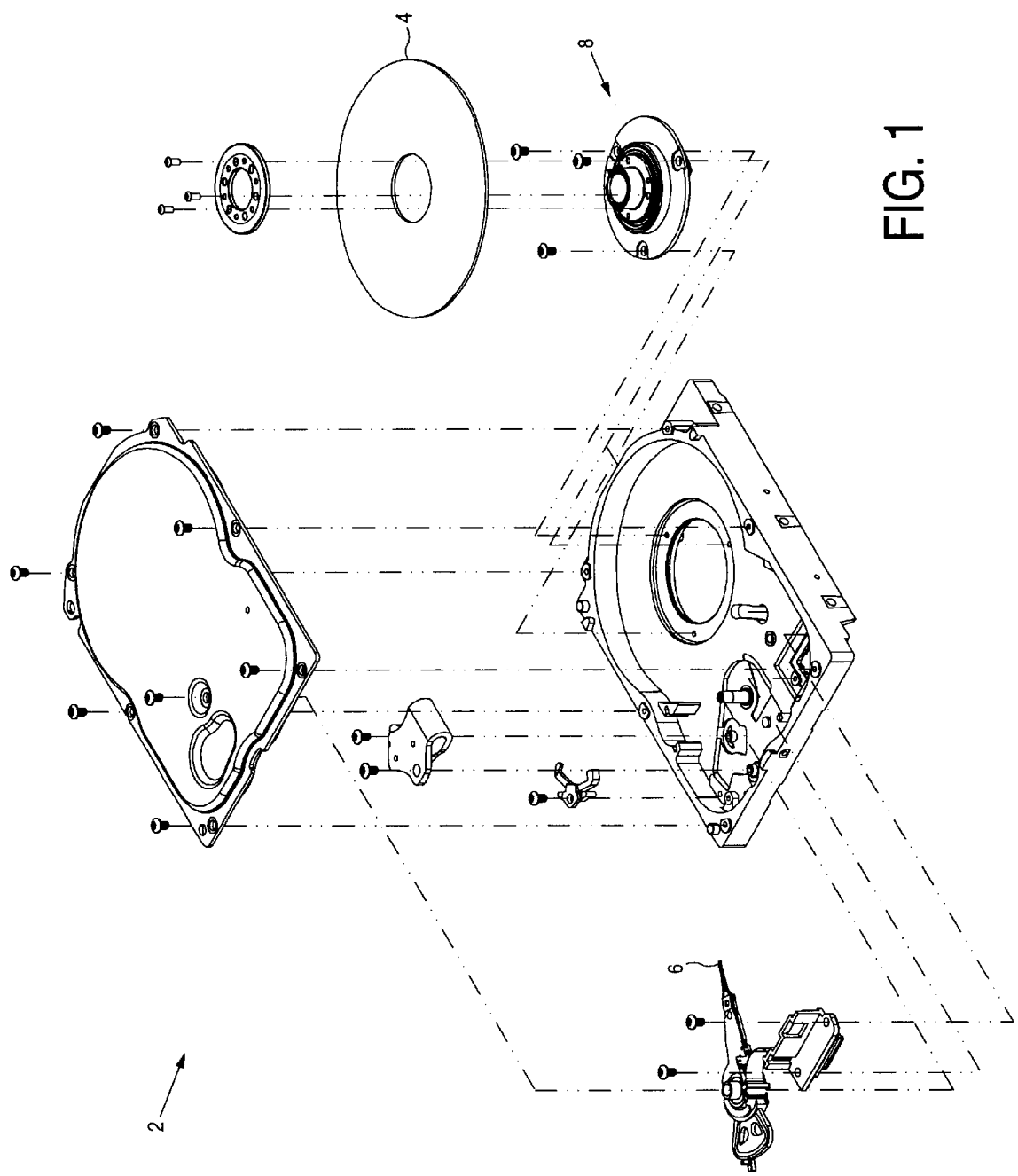

DISK DRIVE EMPLOYING A SPINDLE MOTOR COMPRISING A HUB RATCHET ARM DISENGAGED THROUGH ANGULAR VELOCITY

BACKGROUND OF THE INVENTION

1. Field of the Invention

The present invention relates to disk drives. More particularly, the present invention relates to a disk drive comprising a hub ratchet arm disengaged through angular velocity.

2. Description of the Prior Art

The spindle motor within a disk drive typically employs high accuracy, low noise spindle bearing balls encased in lubricating and anti-rust oils. During shipping, vibrations may cause the spindle bearing balls to oscillate in small back and forth motions causing the bearing balls to push through the lubricating and anti-rust oils until there is metal-on-metal contact. The metal-on-metal contact creates micro spots of fretting corrosion which exacerbates acoustic noise and non-repeatable run-out (NRRO).

There is, therefore, a need for a disk drive which minimizes metal-on-metal contact of the spindle bearing balls due to vibrations during shipping.

SUMMARY OF THE INVENTION

The present invention may be regarded as a disk drive comprising a disk, a head actuated radially over the disk, and a spindle motor for rotating the disk. The spindle motor comprises a stator, a spindle shaft, and a hub rotated by the stator about the spindle shaft and forming a cylindrical cavity with respect to the spindle shaft, the hub comprising a ratchet arm engaging at least one of the spindle shaft and stator. The ratchet arm disengages from the at least one of the spindle shaft and stator due to the hub rotating at an angular velocity greater than a threshold.

In one embodiment, the ratchet arm applies a first frictional force to the at least one of the spindle shaft and stator while the hub is rotating in a first direction, and the ratchet arm applies a second frictional force while the hub attempts to rotate in a second direction opposite the first direction, wherein the second frictional force is greater than the first frictional force. In one embodiment, the ratchet arm comprises a wing member having a distal end for engaging the hub when the hub attempts to rotate in the second direction.

In one embodiment, the ratchet arm disengages from the spindle shaft due to centrifugal force while the hub is rotating at the angular velocity greater than the threshold. In an alternative embodiment, the ratchet arm disengages from the at least one of the spindle shaft and stator due to an air bearing forming between the ratchet arm and the at least one of the spindle shaft and stator while the hub is rotating at the angular velocity greater than the threshold. In yet another embodiment, the ratchet arm disengages from the at least one of the spindle shaft and stator due to windage pushing the ratchet arm away from the at least one of the spindle shaft and stator while the hub is rotating at the angular velocity greater than the threshold.

In one embodiment, the ratchet arm is formed by bending a tab off a rectangular piece of sheet metal, and wrapping the rectangular piece of sheet metal into a cylinder wherein the tab extends into an interior of the cylinder. The cylinder is inserted over the spindle shaft and attached to the hub, wherein the tab engages the spindle shaft.

The present invention may also be regarded as a spindle motor comprising a stator, a spindle shaft, and a hub rotated by the stator about the spindle shaft and forming a cylindrical cavity with respect to the spindle shaft. The hub comprises a ratchet arm engaging at least one of the spindle shaft and stator. The ratchet arm disengages from the at least one of the spindle shaft and stator due to the hub rotating at an angular velocity greater than a threshold.

The present invention may also be regarded as a disk drive comprising a disk, a head actuated radially over the disk, and a spindle motor for rotating the disk. The spindle motor comprises a stator, a spindle shaft, a ratchet arm connected to at least one of the spindle shaft and stator, and a hub rotated by the stator about the spindle shaft and forming a cylindrical cavity with respect to the spindle shaft. The ratchet arm engages the hub when the hub is not rotating, and the ratchet arm disengages from the hub due to the hub rotating at an angular velocity greater than a threshold.

The present invention may also be regarded as a spindle motor comprising a stator, a spindle shaft, a ratchet arm connected to at least one of the spindle shaft and stator, and a hub rotated by the stator about the spindle shaft and forming a cylindrical cavity with respect to the spindle shaft. The ratchet arm engages the hub when the hub is not rotating, and the ratchet arm disengages from the hub due to the hub rotating at an angular velocity greater than a threshold.

BRIEF DESCRIPTION OF THE DRAWINGS

FIG. 1 is an exploded view of a disk drive according to an embodiment of the present invention comprising a disk, a head actuated radially over the disk, and a spindle motor for rotating the disk.

DESCRIPTION OF THE PREFERRED EMBODIMENTS

Figure 2A:
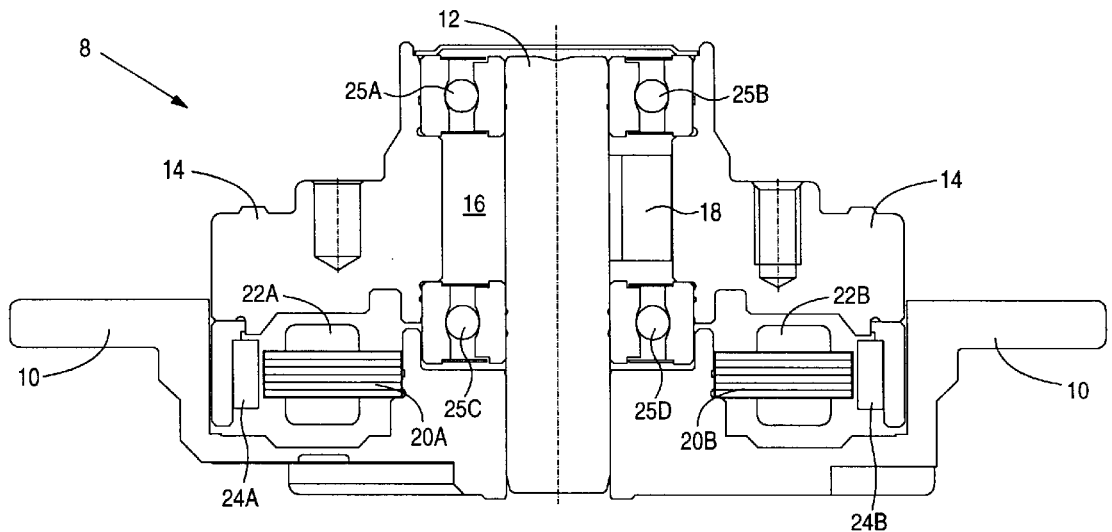
FIG. 2A is a cross-sectional side view of the spindle motor in the disk drive of FIG. 1, including a hub having a ratchet arm for engaging a spindle shaft during shipping to prevent the hub from rotating in a reverse direction.
Figure 2B:
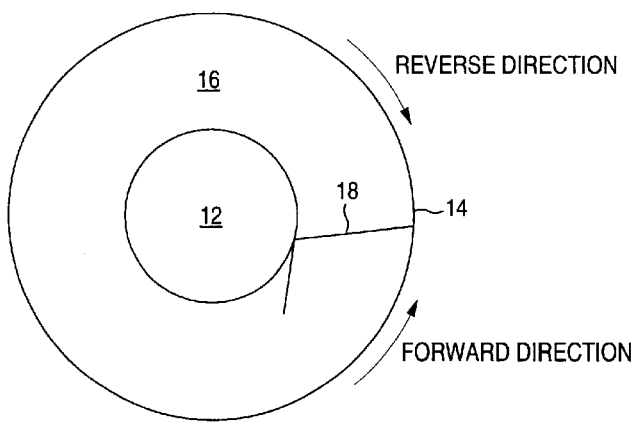
FIGS. 2B and 2C illustrates operation of the ratchet arm of FIG. 2A wherein the ratchet arm disengages from the spindle shaft once the spindle shaft attains a sufficient velocity.
Figure 2C:
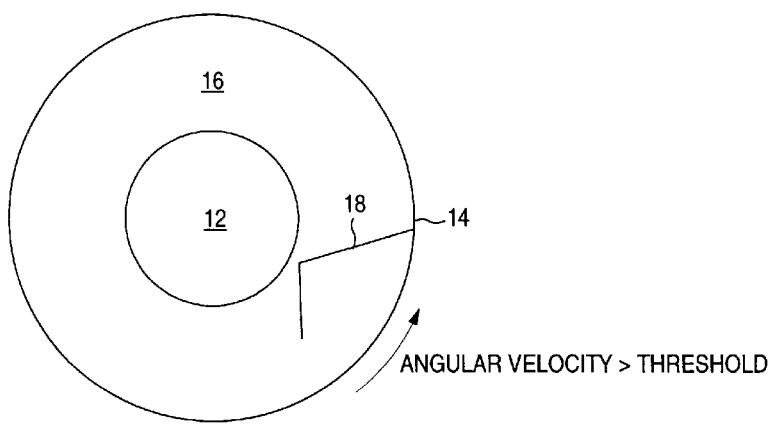

FIG. 1 is an exploded view of a disk drive 2 according to an embodiment of the present invention comprising a disk 4, a head 6 actuated radially over the disk 4, and a spindle motor 8 for rotating the disk 4. As shown in the cross-sectional side view of FIG. 2A, the spindle motor 8 comprises a stator 10, a spindle shaft 12, and a hub 14 rotated by the stator 10 about the spindle shaft 12 and forming a cylindrical cavity 16 with respect to the spindle shaft 12, the hub 14 comprising a ratchet arm 18 engaging at least one of the spindle shaft 12 and stator 10. As shown in FIG. 2C and FIG. 9D, the ratchet arm 16 disengages from the at least one of the spindle shaft 12 and stator 10 while the hub 14 is rotating at an angular velocity greater than a threshold.

The stator 10 includes any component of the spindle motor 8 that is stationary relative to the hub 14. In the embodiment of FIG. 2A, the stator 10 comprises coils 22A and 22B wrapped around metal laminations 20A and 20B. When current is passed through the coils 22A and 22B, a magnetic flux is produced which interacts with magnets 24A and 24B attached to the hub 14 to generate a torque that rotates the hub 14 in a forward direction. During shipping, there is no current applied to the coils 22A and 22B and consequently the hub 14 is essentially free to rotate in either the forward or reverse direction. However, when the hub attempts to rotate in the reverse direction the ratchet arm 18 "bites" into the spindle shaft 12 preventing the hub 14 from rotating in the reverse direction (clockwise in FIG. 2B). Thus, during shipping the hub 14 is allowed to rotate only in the forward direction which helps replenish the lubricating and anti-rust oils protecting the bearing balls 25A–25D, thereby helping to prevent metal-on-metal contact. During normal operation of the disk drive 2, the ratchet arm 18 creates only a small drag as the spindle motor 8 spins up in the forward direction. When the hub 14 rotates at the angular velocity greater than the threshold as shown in FIG. 2C, the ratchet arm 18 disengages from the spindle shaft 12 to minimize power consumption, wear, and debris generation.

In one embodiment, the ratchet arm 18 disengages from the spindle shaft 12 due to centrifugal force while the hub 14 is rotating at the second angular velocity. In an alternative embodiment, the ratchet arm 18 disengages from the spindle shaft 12 due to an air bearing forming between the ratchet arm 18 and the spindle shaft 12 while the hub 14 is rotating at the angular velocity greater than the threshold. In yet another embodiment, the ratchet arm 18 disengages from the spindle shaft 12 due to windage pushing the ratchet arm 18 away from the spindle shaft 12 while the hub 14 is rotating at the angular velocity greater than the threshold.

The ratchet arm 18 may comprise any suitable material. In one embodiment the ratchet arm comprises a metal, such as stainless steel, phosphor bronze or beryllium copper. The metal may be coated with polymers such as polyimide in one embodiment to achieve the desired friction coefficient. In another embodiment, the ratchet arm 18 is formed from injected molded plastic or rubber. Since the ratchet arm 18 is located internal to the spindle motor 8 between the sealed bearing balls 25A–25D, any particles created in the spin-up process are trapped and will not contaminate the disk 4 or the bearing balls 25A–25D.

Figure 3A:
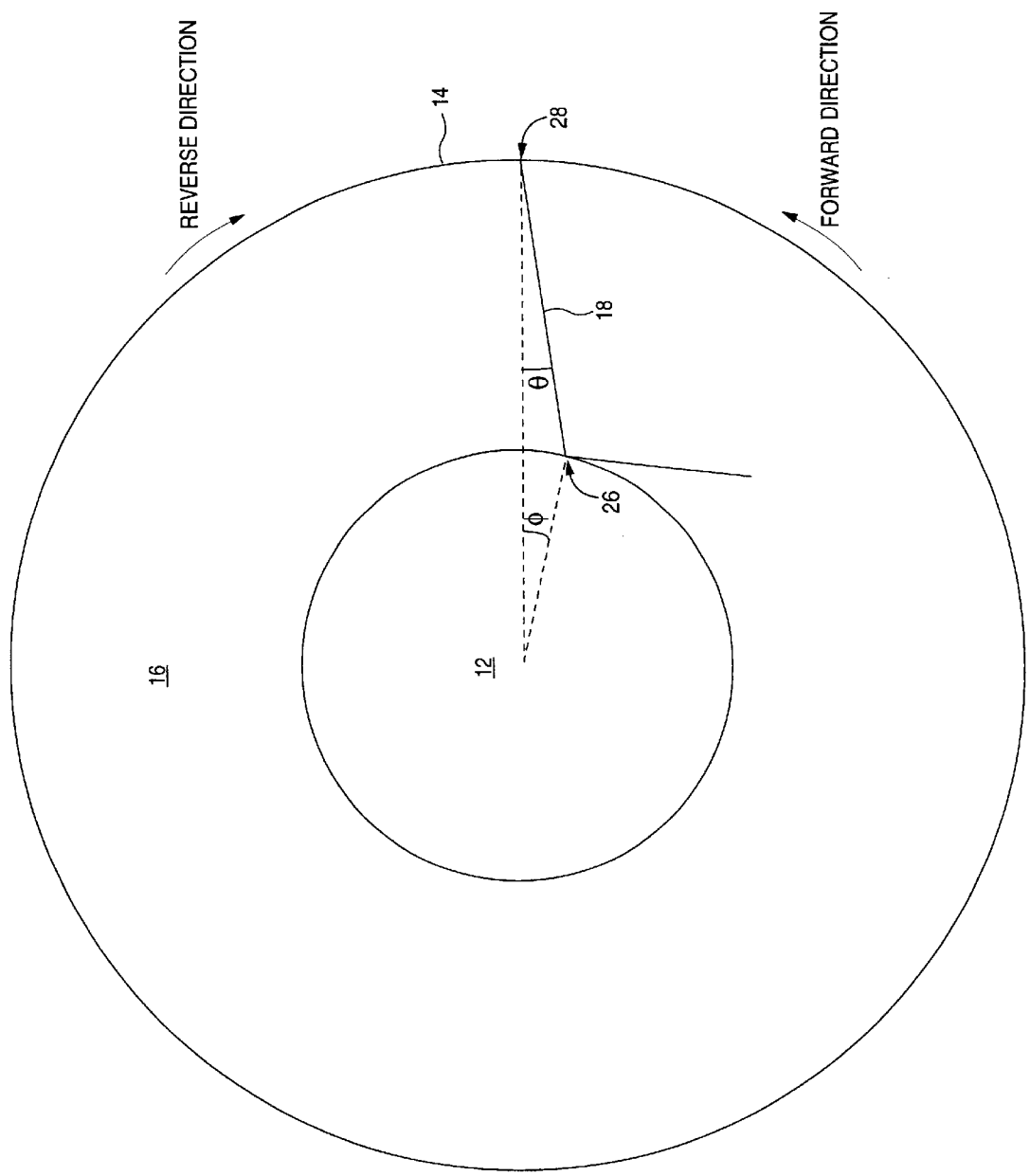
FIG. 3A illustrates geometries for determining a minimum friction coefficient that will cause the ratchet arm of FIGS. 2B and 2C to bite into the spindle shaft and prevent the hub from rotating in the reverse direction.

In one embodiment, the ratchet arm 18 is formed from a thin piece of metal which bends when pressed against the spindle shaft 12 to form a spring. The spring constant Kv and displacement of the spring from neutral determines the amount of force applied to the spindle shaft 12. There should be enough force to ensure the ratchet arm 18 engages the spindle shaft 12 while minimizing the amount of resistance to rotation in the forward direction. When engaged, the angle of the ratchet arm 18 with respect to the spindle shaft 12 together with the resulting friction coefficient cause the ratchet arm 18 to "bite" into the spindle shaft 12 and prevent the hub 14 from rotating in the reverse direction. Referring to FIG. 3A, the ratchet arm 18 will bite into the spindle shaft 12 as long as the friction coefficient is greater than the tangent of the angle ($\phi+\theta$), where $\phi$ is the angle from the center of the spindle shaft 12 to the point of contact 26 with the spindle shaft 12, and $\theta$ is the angle from the point of attachment 28 to the hub 14 to the point of contact 26 with the spindle shaft 12.

Figure 3B:
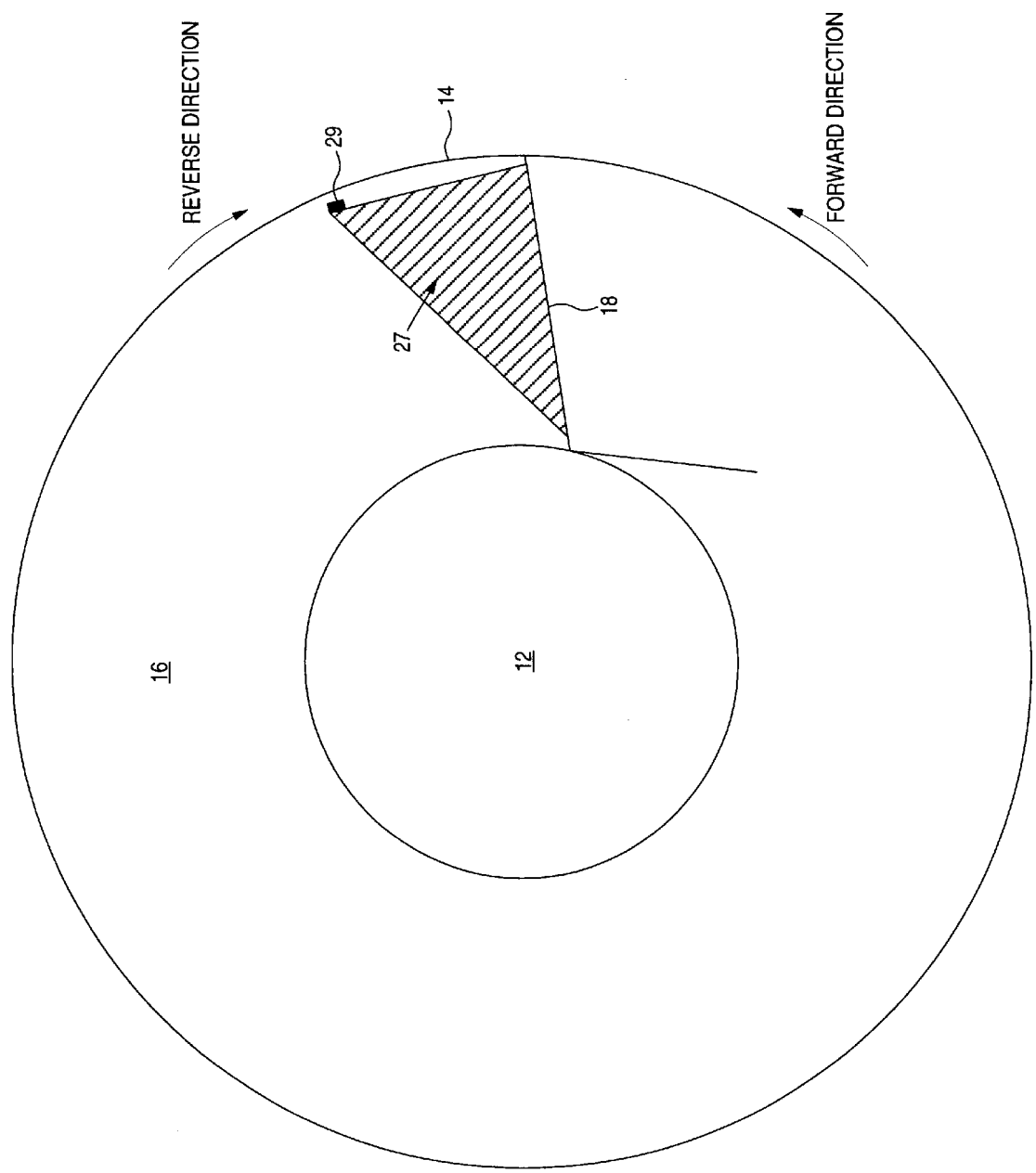
FIG. 3B shows an embodiment wherein the ratchet arm comprises a wing member which reinforces the ratchet arm and helps prevent the ratchet arm from buckling when the hub is subjected to a significant rotational torque in the reverse direction.

In one embodiment, the friction coefficient and/or angle ($\phi+\theta$) are selected so as to prevent the ratchet arm 18 from biting into the spindle shaft 12 (i.e., selected so that the friction coefficient is less than the tangent of ($\phi+\theta$)). This embodiment still provides resistance to rotation in the reverse direction without actually locking the hub 14, thereby helping prevent damage to the ratchet arm 18 when the hub 14 is subjected to a significant torque in the reverse direction. In another embodiment shown in FIG. 3B, the ratchet arm 18 comprises a wing member 27 extending from a back side of the ratchet arm 18. When the hub 14 is subjected to a significant torque in the reverse direction, a distal end 29 of the wing member 27 contacts the hub 14 to help prevent the ratchet arm 18 from buckling. In effect when the wing member 27 contacts the hub 14 the angle θ in FIG. 3A increases allowing the hub to slip in the reverse direction.

Figure 4A:
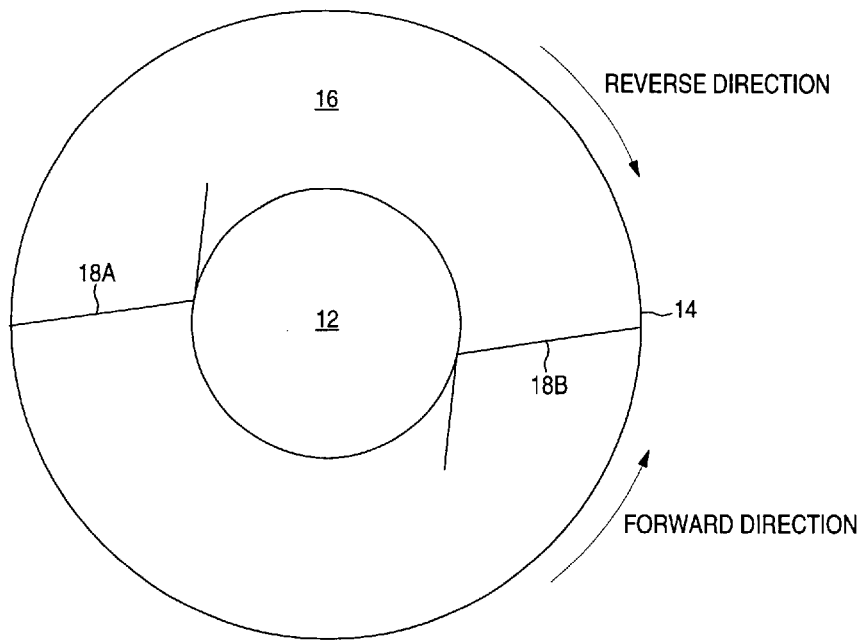
FIGS. 4A and 4B show an embodiment of the present invention wherein two ratchet arms extend from the hub and engage the spindle shaft.
Figure 4B:
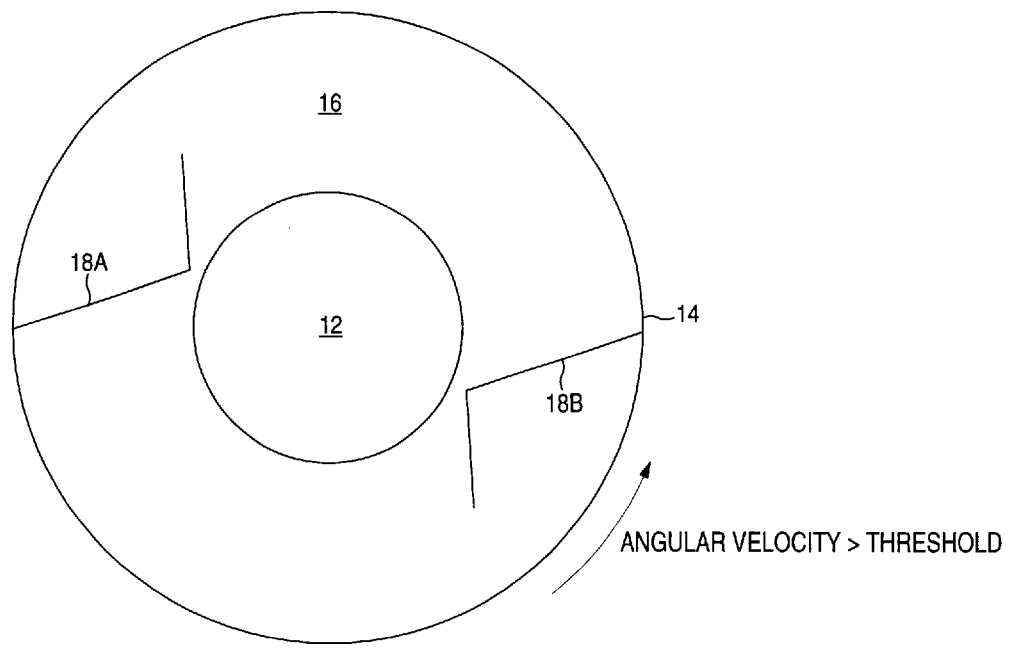
Figure 5A:
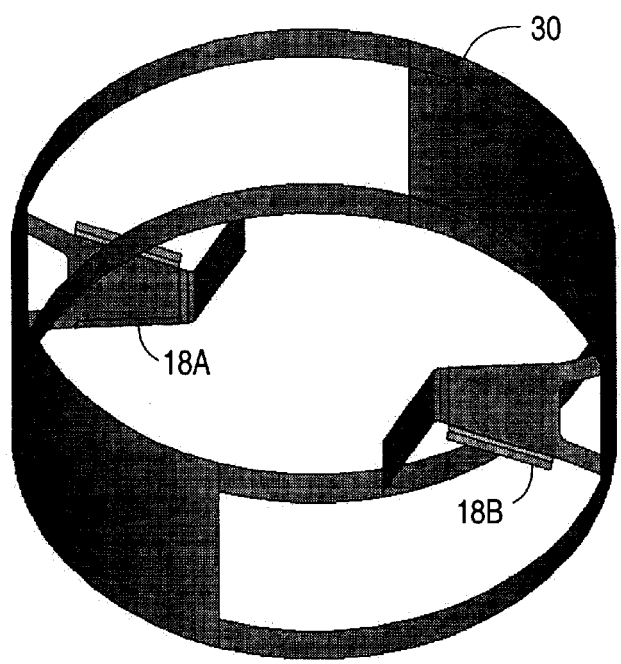
FIGS. 5A and 5B show an isometric view of two ratchet arms engaging a spindle shaft according to an embodiment of the present invention.
Figure 5B:
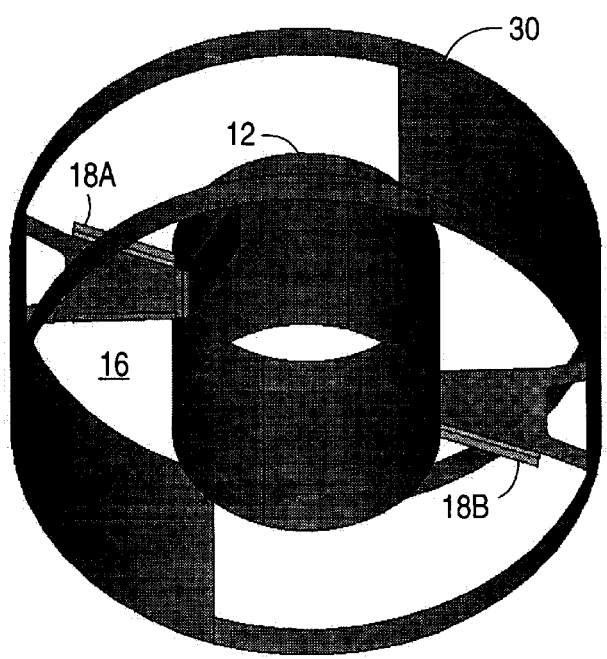

In one embodiment, a plurality of ratchet arms is employed which helps distribute the locking force amongst multiple springs as well as balance the hub 14. FIG. 4A shows an embodiment of the present invention wherein two ratchet arms 18A and 18B engage the spindle shaft 12, and FIG. 4B shows the two ratchet arms 18A and 18B disengaging from the spindle shaft 12 once the hub 14 reaches a sufficient angular velocity. FIGS. 5A and 5B show an isometric view of the ratchet arms 18A and 18B and spindle shaft 12 according to an embodiment of the present invention. In this embodiment, the ratchet arms 18A and 18B are formed by bending tabs from a rectangular piece of sheet metal and wrapping the rectangular piece of sheet metal into a cylinder 30. The tabs which form the ratchet arms 18A and 18B may be bent into any suitable shape using a stamping process. The cylinder 30 is placed over the spindle shaft 12 as shown in FIG. 4B so that the ratchet arms 18A and 18B engage the spindle shaft 12. An exterior surface of the cylinder 30 is attached to the interior surface of the hub 14.

Figure 6A:
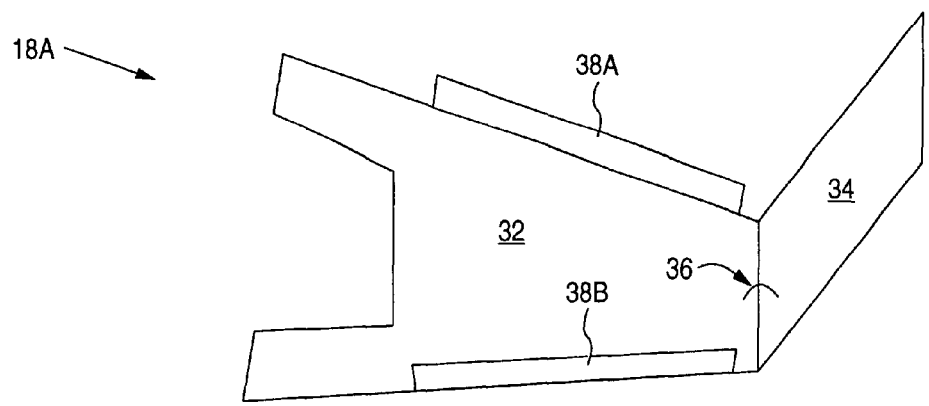
FIG. 6A shows a magnified view of a ratchet arm according to an embodiment of the present invention, including rails formed along the body which increase the stiffness of the spring.
Figure 6B:
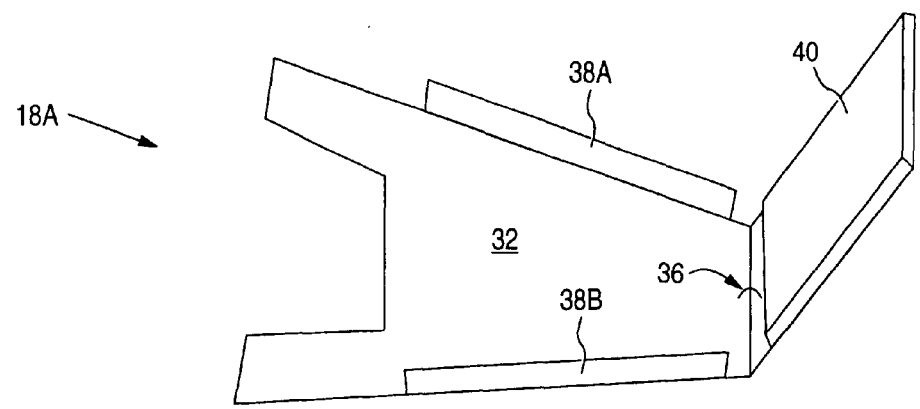
FIG. 6B shows a magnified view of a ratchet arm according to an embodiment of the present invention, including an integrated or attached mass for increasing the centrifugal force which pulls the ratchet arm away from the spindle shaft while the hub is rotating at sufficient angular velocity.
Figure 6C:
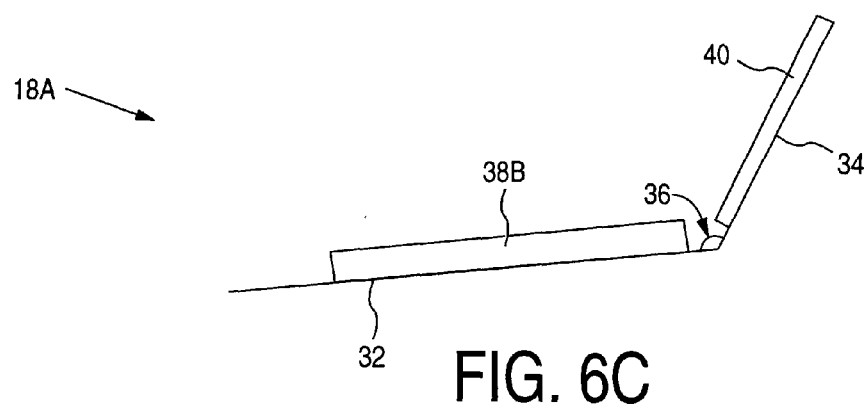
FIG. 6C is a side view of the ratchet arm of FIG. 6B illustrating the rails and added mass.

FIG. 6A is a magnified view of the ratchet arm 18A shown in FIG. 5A comprising a body segment 32 and a distal segment 34 extending from the body segment 32 at a predetermined angle 36. The deflection of the body segment 32 when the ratchet arm 18A is pressed against the spindle shaft 12 creates a spring force on the spindle shaft 12. In the embodiment shown in FIG. 6A, the body segment 32 comprises rails 38A and 38B which help increase the stiffness of the spring. The rails 38A and 38B may be formed in any suitable manner such as with a stamping process. The distal segment 34 provides mass which helps pull the ratchet arm 18A away from the spindle shaft 12 due to the centrifugal force generated by the hub rotating 14 at sufficient velocity. In one embodiment, the length of the distal segment 34 is selected to ensure there is sufficient mass, and in an alternative embodiment shown in FIG. 6B, a weight 40 is added to the distal segment 34. The weight 40 may be integrally formed with the distal end 34 or attached, for example, through welding or glue. FIG. 6C shows a side view of the ratchet arm 18A further illustrating the rail 38B and weight 40.

Figure 7A:
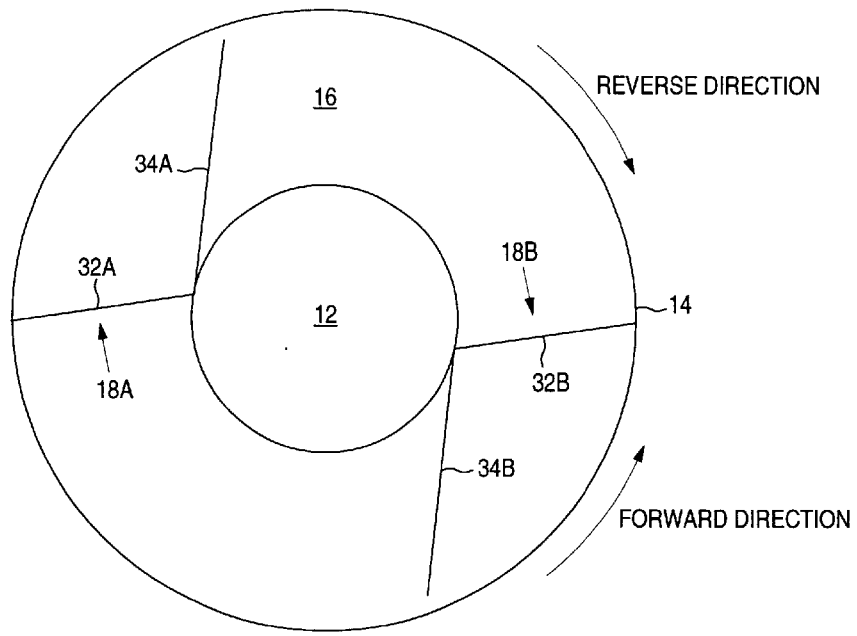
FIGS. 7A and 7B show an embodiment of the present invention wherein the distal end of the ratchet arms is extended to increase the mass as well as abut the hub when disengaged from the spindle shaft to help prevent damaging the ratchet arms.
Figure 7B:
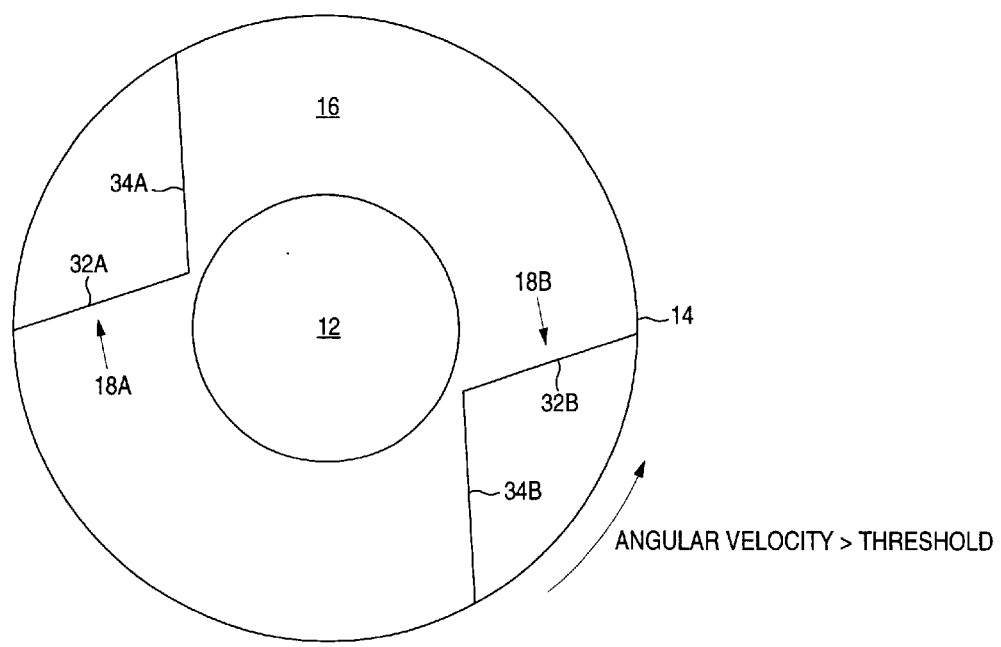

FIG. 7A shows an embodiment of the present invention wherein the distal ends 34A and 34B of the ratchet arms 18A and 18B are extended until there is only a small gap between the distal ends 34A and 34B and the hub 14. As shown in FIG. 7B, when the hub 14 spins up to speed causing the ratchet arms 18A and 18B to disengage from the spindle shaft 12, the distal ends 34A and 34B abut the hub 14 thereby limiting the displacement of the spring which helps prevent overstressing the ratchet arms 18A and 18B.

Figure 8A:
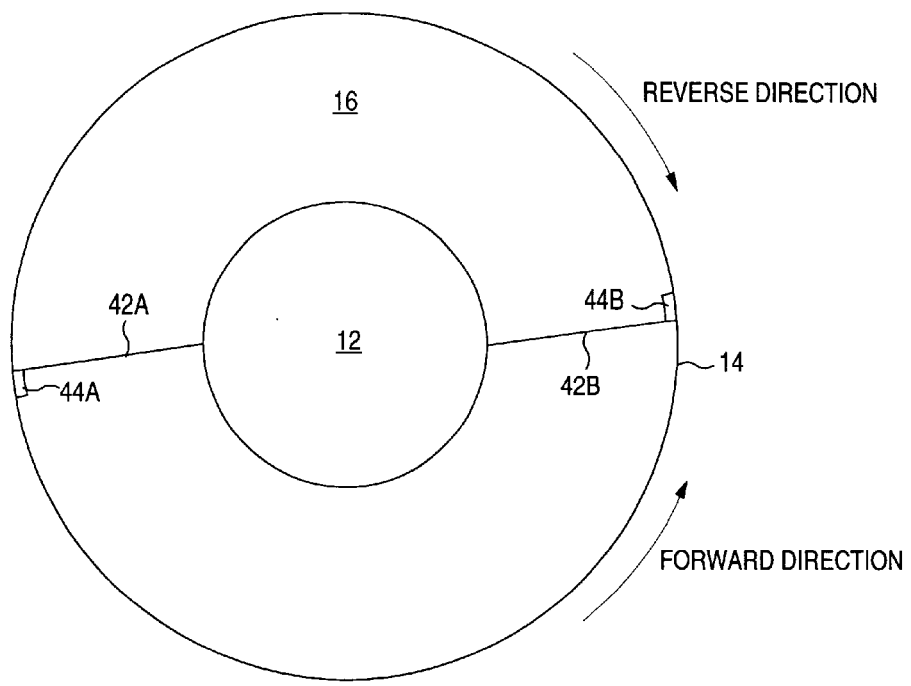
FIG. 8A shows an embodiment of the present invention wherein a ratchet arm is attached to the spindle shaft and engages the hub when rotating at a low angular velocity (or not at all).
Figure 8B:
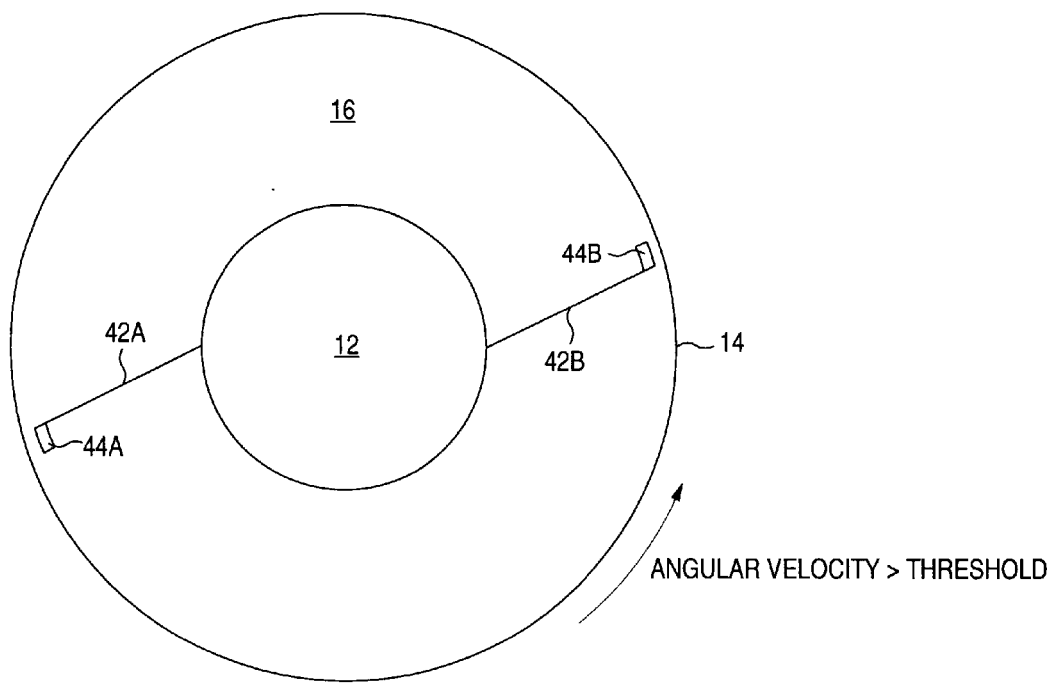
FIG. 8B illustrates how the ratchet arm of FIG. 8A disengages from the hub when the hub rotates at a sufficient velocity causing an air bearing to form between the ratchet arm and the hub.

FIG. 8A shows an embodiment of the present invention wherein ratchet arms 42A and 42B are attached to the spindle shaft 12 having a slider 44A and 44B attached to the distal end for engaging the hub 14. As shown in FIG. 8B, when the hub 14 rotates at sufficient angular velocity the ratchet arms 42A and 42B disengage from the spindle shaft 12. In one embodiment, the ratchet arms 42A and 42B disengage from the hub 14 due to an air bearing forming between the sliders 44A and 44B and the hub 14. In another embodiment, the ratchet arms 42A and 42B disengage from the hub 14 due to windage pushing the ratchet arms 42A and 42B away from the hub 14. The sliders 44A and 44B may comprise any suitable shape which may include a curved surface which follows the curvature of the hub 14 in order to increase the area of contact with the hub 14. In one embodiment, the ratchet arms 42A and 42B are formed by bending tabs from a rectangular piece of sheet metal. The sheet metal is wrapped into a cylinder such that the tabs extend radially outward from the cylinder. The cylinder is then placed over the spindle shaft 12 such that an interior surface of the cylinder attaches to the spindle shaft 12 and the tabs engage the hub 14.

Figure 9A:
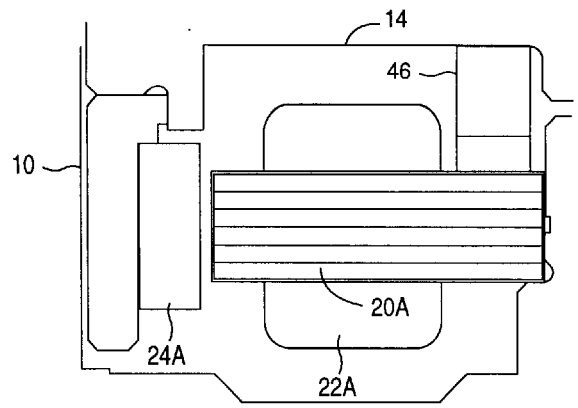
FIG. 9A shows a magnified section of the spindle motor of FIG. 2A according to an embodiment of the present invention wherein a ratchet arm is connected to the hub and engages the stator.
Figure 9B:
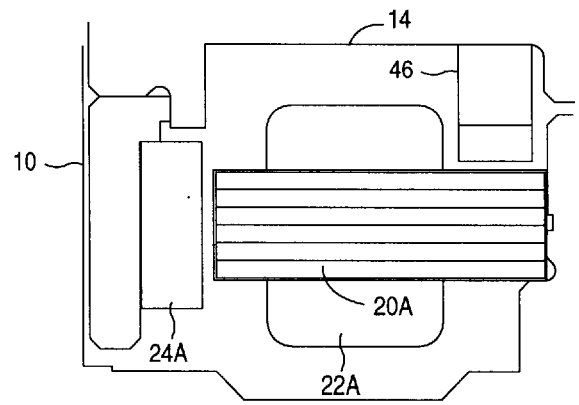
FIG. 9B illustrates how the ratchet arm of FIG. 9A disengages from the stator when the hub rotates at a sufficient velocity causing an air bearing to form between the ratchet arm and the stator.
Figure 9C:
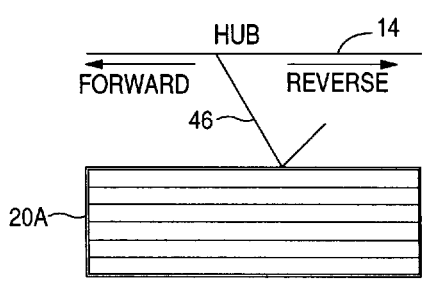
FIGS. 9C and 9D show side views of the ratchet arm of FIGS. 9A and 9B.
Figure 9D:
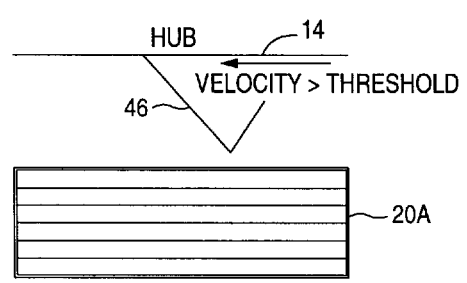

FIG. 9A shows a magnified section of the spindle motor of FIG. 2A according to embodiment of the present invention wherein a ratchet arm 46 is connected to the hub 14 and engages the stator 10 (e.g., lamination 20A). In one embodiment, the stator 10 comprises a suitable wear surface (e.g., plastic) for contacting the ratchet arm 46. FIG. 9B illustrates how the ratchet arm 46 of FIG. 9A disengages from the stator 10 when the hub 14 rotates at a sufficient velocity causing an air bearing to form between the ratchet arm 46 and the stator 10. FIGS. 9C and 9D show side views of the ratchet arm 46 of FIGS. 9A and 9B.

Figure 10A:
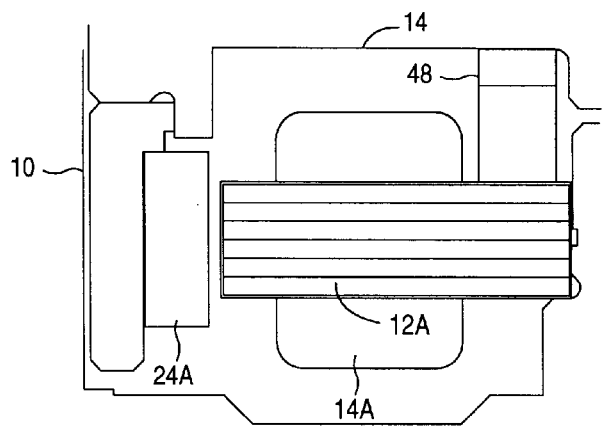
FIG. 10A shows a magnified section of the spindle motor of FIG. 2A according to an embodiment of the present invention wherein a ratchet arm is connected to the stator and engages the hub.
Figure 10B:
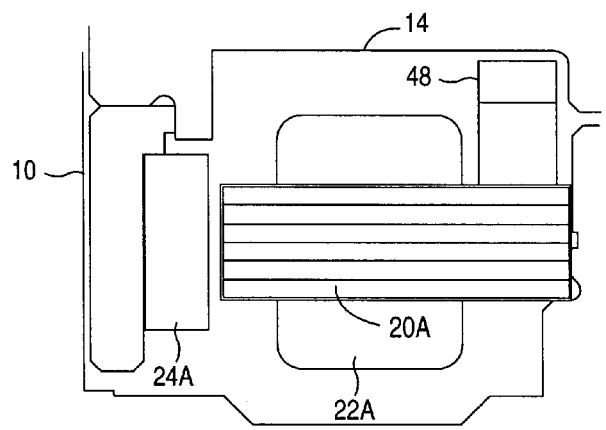
FIG. 10B illustrates how the ratchet arm of FIG. 10A disengages from the hub when the hub rotates at a sufficient velocity causing an air bearing to form between the ratchet arm and the hub.
Figure 10C:
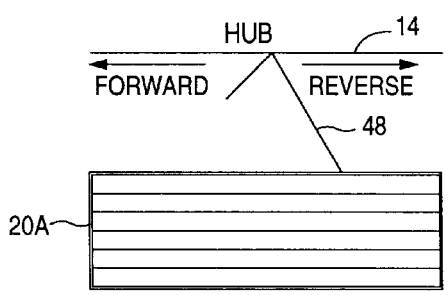
FIGS. 10C and 10D show side views of the ratchet arm of FIGS. 10A and 10B.
Figure 10D:
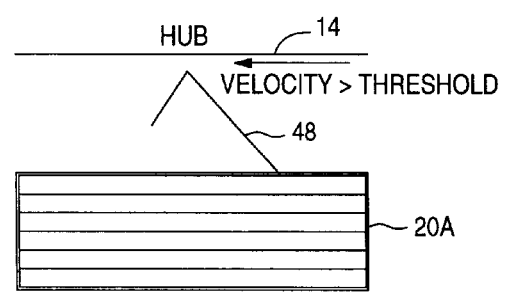

FIG. 10A shows a magnified section of the spindle motor of FIG. 2A according to an embodiment of the present invention wherein a ratchet arm 48 is connected to the stator 10 (e.g., lamination 20A) and engages the hub 14. In one embodiment, the hub 14 comprises a suitable wear surface (e.g., plastic) for contacting the ratchet arm 48. FIG. 10B illustrates how the ratchet arm 48 of FIG. 10A disengages from the hub 14 when the hub 14 rotates at a sufficient velocity causing an air bearing to form between the ratchet arm 48 and the hub 14. FIGS. 10C and 10D show side views of the ratchet arm of FIGS. 10A and 10B.

Figure 11A:
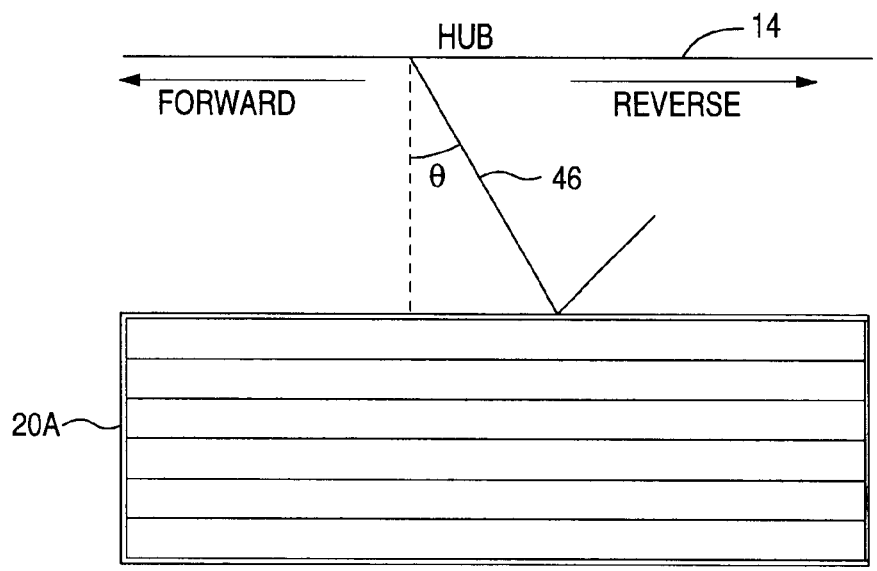
FIG. 11A is a magnified view of FIG. 9C illustrating the angle θ which together with the friction coefficient determines whether the hub will lock in the reverse direction.
Figure 11B:
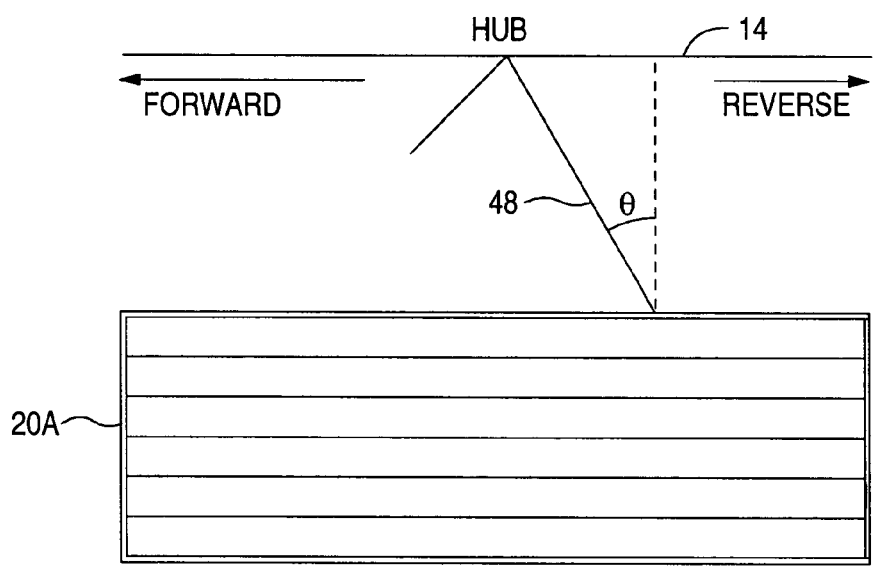
FIG. 11B is a magnified view of FIG. 10C illustrating the angle θ which together with the friction coefficient determines whether the hub will lock in the reverse direction.

In the embodiments of FIGS. 9C and 10C, the angle of the ratchet arm and the friction coefficient are selected so that the hub 14 either slips or locks in the reverse direction. FIG. 11A shows a magnified view of FIG. 9C wherein the ratchet arm 46 will bite into the stator 10 and prevent the hub 14 from rotating in the reverse direction if the friction coefficient is greater than the tangent of the angle θ. FIG. 11B shows a magnified view of FIG. 10C wherein the ratchet arm 48 will bite into the hub 14 and prevent the hub 14 from rotating in the reverse direction if the friction coefficient is greater than the tangent of the angle θ.

In one embodiment, the friction coefficient and/or the angle θ are selected to allow the hub 14 to slip in the reverse direction. The frictional force (drag) between the ratchet arm and the contact surface when the hub 14 rotates in the forward direction is computed according to:

$$F = (u * P * \sin \theta) / (\sin \theta + u * \cos \theta)$$

The frictional force (drag) between the ratchet arm and the contact surface when the hub 14 rotates in the reverse direction is computed according to:

$$F = (u * P * \sin \theta) / (\sin \theta - u * \cos \theta)$$

In the above equations:
F=Frictional force between ratchet arm and contact surface.
u=Friction coefficient between ratchet arm and contact surface.
θ=Angle that ratchet arm makes with the vertical.
P=Preload force or vertical force applied to the tip of the ratchet arm.

The above equations show that the frictional force in the reverse direction is greater than the frictional force in the forward direction.

We claim:

1. A disk drive comprising:
   (a) a disk;
   (b) a head actuated radially over the disk;
   (c) a spindle motor for rotating the disk, the spindle motor comprising;
       a stator;
       a spindle shaft; and
       a hub rotated by the stator about the spindle shaft and forming a cylindrical cavity with respect to the spindle shaft, the hub comprising a ratchet arm engaging at least one of the spindle shaft and stator;
   wherein the ratchet arm disengages from the at least one of the spindle shaft and stator due to the hub rotating at an angular velocity greater than a threshold.

2. The disk drive as recited in claim 1, wherein when the ratchet arm engages at least one of the spindle shaft and stator:
   (a) the ratchet arm applies a first frictional force while the hub is rotating in a first direction; and
   (b) the ratchet arm applies a second frictional force while the hub attempts to rotate in a second direction opposite the first direction, wherein the second frictional force is greater than the first frictional force.

3. The disk drive as recited in claim 1, wherein the ratchet arm disengages from the spindle shaft due to centrifugal force while the hub is rotating at the angular velocity greater than the threshold.

4. The disk drive as recited in claim 1, wherein the ratchet arm disengages from the at least one of the spindle shaft and stator due to an air bearing forming between the ratchet arm and the at least one of the spindle shaft and stator while the hub is rotating at the angular velocity greater than the threshold.

5. The disk drive as recited in claim 1, wherein the ratchet arm disengages from the at least one of the spindle shaft and stator due to windage pushing the ratchet arm away from the at least one of the spindle shaft and stator while the hub is rotating at the angular velocity greater than the threshold.

6. The disk drive as recited in claim 1, wherein the ratchet arm is formed by:
   (a) bending a tab off a rectangular piece of sheet metal;
   (b) wrapping the rectangular piece of sheet meal into a cylinder wherein the tab extends into an interior of the cylinder; and
   (c) inserting the cylinder over the spindle shaft and attaching an exterior surface of the cylinder to the hub, wherein the tab engages the spindle shaft.

7. The disk drive as recited in claim 2, wherein the ratchet arm comprises a wing member for preventing the ratchet arm from buckling when the hub attempts to rotate in the second direction.

8. A spindle motor for use in rotating a disk in a disk drive, the spindle motor comprising:
   (a) a stator;
   (b) a spindle shaft; and
   (c) a hub rotated by the stator about the spindle shaft and forming a cylindrical cavity with respect to the spindle shaft, the hub comprising a ratchet arm engaging at least one of the spindle shaft and stator;
   wherein the ratchet arm disengages from the at least one of the spindle shaft and stator due to the hub rotating at an angular velocity greater than a threshold.

9. The spindle motor as recited in claim 8, wherein when the ratchet arm engages the at least one of the spindle shaft and stator:
   (a) the ratchet arm applies a first frictional force while the hub is rotating in a first direction; and
   (b) the ratchet arm applies a second frictional force while the hub attempts to rotate in a second direction opposite the first direction, wherein the second frictional force is greater than the first frictional force.

10. The spindle motor as recited in claim 8, wherein the ratchet arm disengages from the spindle shaft due to centrifugal force while the hub is rotating at the angular velocity greater than the threshold.

11. The spindle motor as recited in claim 8, wherein the ratchet arm disengages from the at least one of the spindle shaft and stator due to an air bearing forming between the ratchet arm and the at least one of the spindle shaft and stator while the hub is rotating at the angular velocity greater than the threshold.

12. The spindle motor as recited in claim 8, wherein the ratchet arm disengages from the at least one of the spindle shaft and stator due to windage pushing the ratchet arm away from the at least one of the spindle shaft and stator while the hub is rotating at the angular velocity greater than the threshold.

13. The spindle motor as recited in claim 8, wherein the ratchet arm is formed by:
   (a) bending a tab off a rectangular piece of sheet metal;
   (b) wrapping the rectangular piece of sheet metal into a cylinder wherein the tab extends into an interior of the cylinder; and
   (c) inserting the cylinder over the spindle shaft and attaching an exterior surface of the cylinder to the hub, wherein the tab engages the spindle shaft.

14. The spindle motor as recited in claim 9, wherein the ratchet arm comprises a wing member for preventing the ratchet arm from buckling when the hub attempts to rotate in the second direction.

15. A disk drive comprising:
   (a) a disk;
   (b) a head actuated radially over the disk;
   (c) a spindle motor for rotating the disk, the spindle motor comprising;
       a stator;
       a spindle shaft;
       a ratchet arm connected to at least one of the spindle shaft and stator; and
       a hub rotated by the suitor about the spindle shaft and forming a cylindrical cavity with respect to the spindle shaft;
   wherein:
       the ratchet arm engages the hub when the hub is not rotating; and
       the ratchet arm disengages from the hub due to the hub rotating at an angular velocity greater than a threshold.

16. The disk drive as recited in claim 15, wherein when the ratchet arm engages the hub:
   (a) the ratchet arm applies a first frictional force to the hub while the hub is rotating in a first direction; and
   (b) the ratchet arm applies a second frictional force to the hub while the hub attempts to rotate in a second direction opposite the first direction, wherein the second frictional force is greater than the first frictional force.

17. The disk drive as recited in claim 15, wherein the ratchet arm disengages from the hub due to an air bearing forming between the ratchet arm and the hub while the hub is rotating at an angular velocity greater than the threshold.

18. The disk drive as recited in claim 15, wherein the ratchet arm disengages from the hub due to windage pushing the ratchet arm away from the hub while the hub is rotating at an angular velocity greater than the threshold.

19. The disk drive as recited in claim 15, wherein the ratchet arm is formed by:
   (a) bending a tab off a rectangular piece of sheet metal;
   (b) wrapping the rectangular piece of sheet metal into a cylinder wherein the tab extends radially outward from the cylinder; and
   (c) inserting the cylinder over the spindle shaft and attaching an interior surface of the cylinder to the spindle shaft, wherein the tab engages the hub.

20. A spindle motor for use in rotating a disk in a disk drive, the spindle motor comprising:
   (a) a stator;
   (b) a spindle shaft;
   (c) a ratchet arm connected to at least one of the spindle shaft and stator; and
   (d) a hub rotated by the stator about the spindle shaft and forming a cylindrical cavity with respect to the spindle shaft;
   wherein:
   the ratchet arm engages the hub when the hub is not rotating; and
   the ratchet arm disengages from the hub due to the hub rotating at an angular velocity greater than a threshold.

21. The spindle motor as recited in claim 20, wherein when the ratchet arm engages the hub:
   (a) the ratchet arm applies a first frictional force to the hub while the hub is rotating in a first direction; and
   (b) the ratchet arm applies a second frictional force to the hub while the hub attempts to rotate in a second direction opposite the first direction, wherein the second frictional force is greater than the first frictional force.

22. The spindle motor as recited in claim 20, wherein the ratchet arm disengages from the hub due to an air bearing forming between the ratchet arm and the hub while the hub is rotating at an angular velocity greater than the threshold.

23. The spindle motor as recited in claim 20, wherein the ratchet arm disengages from the hub due to windage pushing the ratchet arm away from the hub while the hub is rotating at an angular velocity greater than the threshold.

24. The spindle motor as recited in claim 20, wherein the ratchet arm is formed by:
   (a) bending a tab off a rectangular piece of sheet metal;
   (b) wrapping the rectangular piece of sheet metal into a cylinder wherein the tab extends radially outward from the cylinder; and
   (c) inserting the cylinder over the spindle shaft and attaching an interior surface of the cylinder to the spindle shaft, wherein the tab engages the hub.

\* \* \* \* \*